(12) United States Patent
Lin et al.

(10) Patent No.: US 7,251,851 B2
(45) Date of Patent: Aug. 7, 2007

(54) SPIRAL DUSTER

(75) Inventors: Pai-Yung Lin, Taipei (TW); Yi-Jun Pan, Taipei (TW)

(73) Assignee: Oimo Industrial Company, Ltd., Taipei (TW)

( * ) Notice: Subject to any disclaimer, the term of this patent is extended or adjusted under 35 U.S.C. 154(b) by 209 days.

(21) Appl. No.: 10/986,723

(22) Filed: Nov. 12, 2004

(65) Prior Publication Data

US 2006/0101602 A1 May 18, 2006

(51) Int. Cl.
*A47L 13/20* (2006.01)
*A47L 13/12* (2006.01)

(52) U.S. Cl. .............. 15/229.1; 15/229.3; 15/229.7; 15/209.1

(58) Field of Classification Search ............ 15/209.1, 15/229.1, 229.3, 229.4, 223, 226, 229.7
See application file for complete search history.

(56) References Cited

U.S. PATENT DOCUMENTS

| | | | | |
|---|---|---|---|---|
| 823,725 A | * | 6/1906 | Hayden | ............... 15/114 |
| 1,437,145 A | * | 11/1922 | Johnson | ............... 15/210.1 |
| 2,320,372 A | * | 6/1943 | McCarthy | ............... 15/229.7 |
| 5,953,784 A | * | 9/1999 | Suzuki et al. | ............... 15/209.1 |
| 6,813,801 B2 | * | 11/2004 | Tanaka et al. | ............... 15/229.3 |
| 6,968,591 B2 | * | 11/2005 | Tanaka | ............... 15/229.1 |
| 6,978,509 B2 | * | 12/2005 | Lin | ............... 15/229.7 |

* cited by examiner

*Primary Examiner*—Gladys JP Corcoran
*Assistant Examiner*—Laura C Guidotti
(74) *Attorney, Agent, or Firm*—Birch, Stewart, Kolasch & Birch, LLP (57) ABSTRACT

A spiral duster includes a cleaning cloth, a handle, a bent member connected to the handle, a bent tenon connected to the bent member, and a spiral member having a neck connected to the bent tenon and a flat portion extended from the neck, wherein two studs are formed on lower portions of the lateral surfaces of the bent member respectively; the bent tenon has a cambered recess for receiving the bent member; two holes are formed on lower portions of the lateral surfaces of the cambered recess respectively for receiving the studs on the bent member; the spiral member is to be received in a pocket of the cleaning cloth; a slot is disposed under the flat portion; a bar is inserted into the slot for fixing the cleaning cloth to the spiral member; and the cleaning cloth becomes spiral by wrapping around the spiral member.

13 Claims, 10 Drawing Sheets

SPIRAL DUSTER

BACKGROUND OF THE INVENTION

Field of the Invention

The present invention relates to dusters, and in particular to spiral dusters made of a cleaning cloth including a number of non-woven fabric layers and yarn layers, a handle, a spiral member, and a tenon. The cleaning cloth becomes spiral by wrapping around the spiral member. Thereby the spiral duster may wipe objects from various angles.

In the prior art duster, a cleaning cloth is combined with a handle. The handle has a hook for fixing the cleaning cloth. However, the combination of the cleaning cloth and the handle is not firm enough by merely using the hook. Thereby the cleaning cloth tends to separate from the handle. Moreover, the cleaning cloth has only one surface providing cleaning function. A user thus needs to adjust the direction of cleaning cloth frequently according to the variation in the orientations of the surfaces to be cleaned. This makes it more inconvenient in cleaning, and after using such a duster for a long time, the user's wrist may be sore.

SUMMARY OF THE INVENTION

Accordingly, the primary object of the present invention is to provide a spiral duster including a cleaning cloth, a handle, a bent member, a bent tenon, and a spiral member.

The cleaning cloth has an eight-layer structure including two smooth non-woven fabric layers as liner layers, two first electrostatic non-woven fabric layers disposed on the outer surfaces of the smooth non-woven fabric layers respectively, two yarn layers disposed on the outer surfaces of the first electrostatic non-woven fabric layers respectively, and two second electrostatic non-woven fabric layers disposed on the outer surfaces of the yarn layers respectively. The surfaces of the first electrostatic non-woven fabric layers and the second electrostatic non-woven fabric layers are processed to be meshed by thermal pressing. The smooth non-woven fabric layers, the first electrostatic non-woven fabric layers, and the second electrostatic non-woven fabric layers are also cut to form a number of strips on the lateral sides. A number of spots are left on the cleaning cloth by thermal-pressing so as to form a pocket in the middle of the cleaning cloth.

The handle has a through hole at the rear end. A embossment is formed at the front end of the handle. Further, a number of indentations are formed on the lateral surfaces of the handle for better manipulation. The bent member is connected to the front end of the handle. The two lateral surfaces of the bent member are formed with respective grooves. Two studs are formed on the lower portions of the two lateral surfaces of the bent member respectively, and a recessed channel is disposed in the middle of the bent member.

The bent tenon is connected to the bent member. The bent tenon has a cambered recess for receiving the bent member. Each of the two lateral surfaces of the cambered recess includes a flange to engage with the grooves. Two holes are formed on the lower portion of the lateral surfaces of the cambered recess respectively for receiving the studs.

The spiral member has a neck connected to the front end of the bent tenon and a flat portion extended from the neck. A slot is disposed under the flat portion. The spiral member is to be received in the pocket of the cleaning cloth, such that the cleaning cloth becomes spiral by wrapping around the spiral member. One end of the cleaning cloth is inserted into the slot. A bar is inserted into the slot for fixing the cleaning cloth to the spiral member.

DETAIL DESCRIPTION OF THE INVENTION

Figure 1:
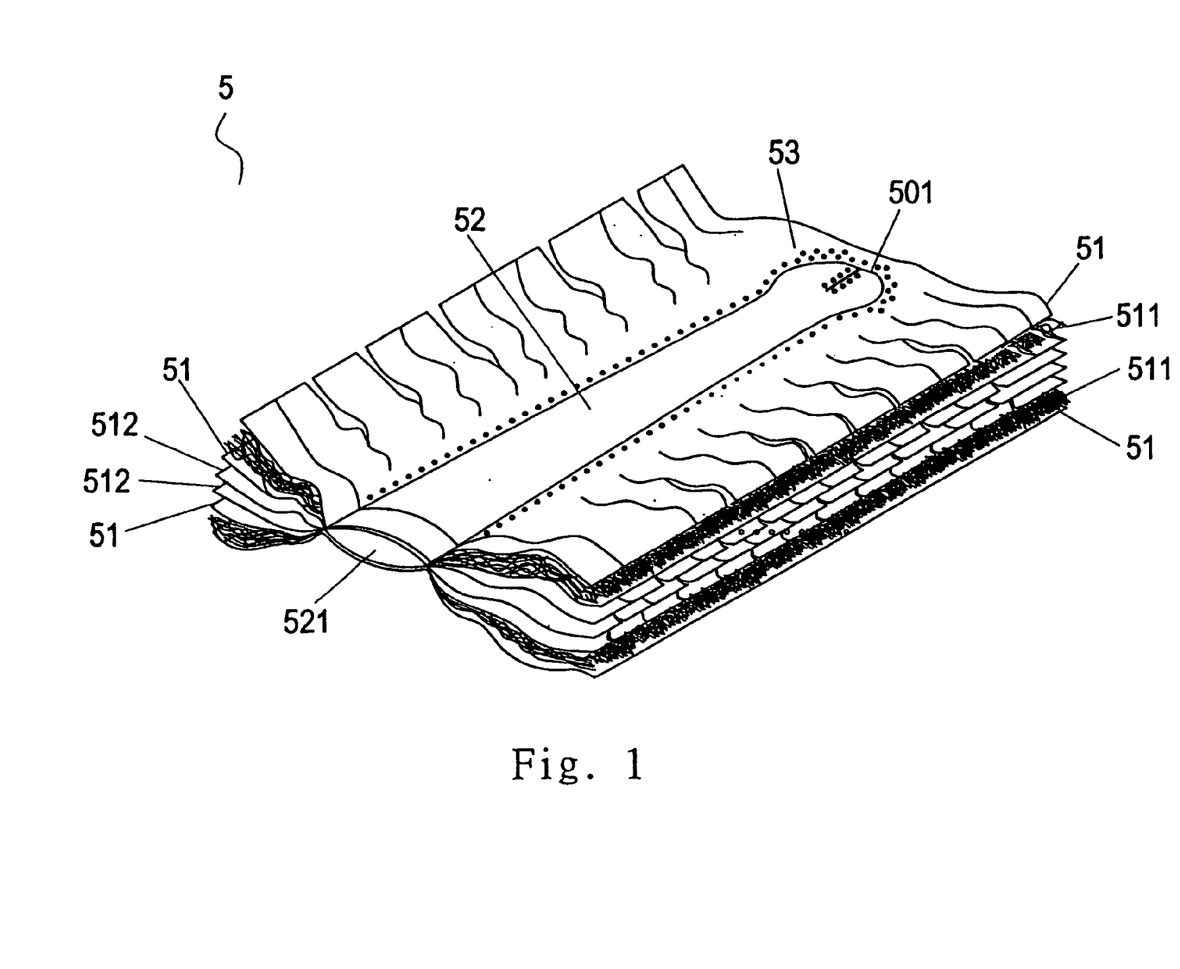
FIG. 1 is a schematic view of the cleaning cloth of the spiral duster according to the present invention.

Refer to FIG. 1, which is a schematic view of the cleaning cloth of the spiral duster according to the present invention. As shown, the cleaning cloth 5 includes two smooth non-woven fabric layers 512 as liner layers and two first electrostatic non-woven fabric layers 51 disposed on the outer surfaces of the smooth non-woven fabric layers 512 respectively. The four layers are processed by thermal-processing, such that the surfaces of the first electrostatic non-woven fabric layers 51 become meshed. The four layers are further cut to form a number of strips on the lateral sides.

Next, two yarn layers 511 are disposed on the outer surfaces of the two first electrostatic non-woven fabric layers 51 respectively. The thermoplastic yarn layers 511 are made of, Two second electrostatic non-woven fabric layers 51 are then disposed on the outer surfaces of two yarn layers 511 respectively. The surfaces of the second electrostatic non-woven fabric layers 51 are processed to be meshed by thermal-pressing, and the second electrostatic non-woven fabric layers 51 are also cut to form a number of strips on the lateral sides in advance.

The cleaning cloth 5 thus includes an eight-layer structure with a number of strips on the lateral sides.

Further, a number of spots 53 are left on the cleaning cloth 5 by thermal-pressing, so as to firmly secure the eight-layer structure and to form a pocket 52 with an opening 521 in the middle of the cleaning cloth 5. The pocket 52 may also includes a biforked section 501 for receiving a biforked handle.

Figure 3:
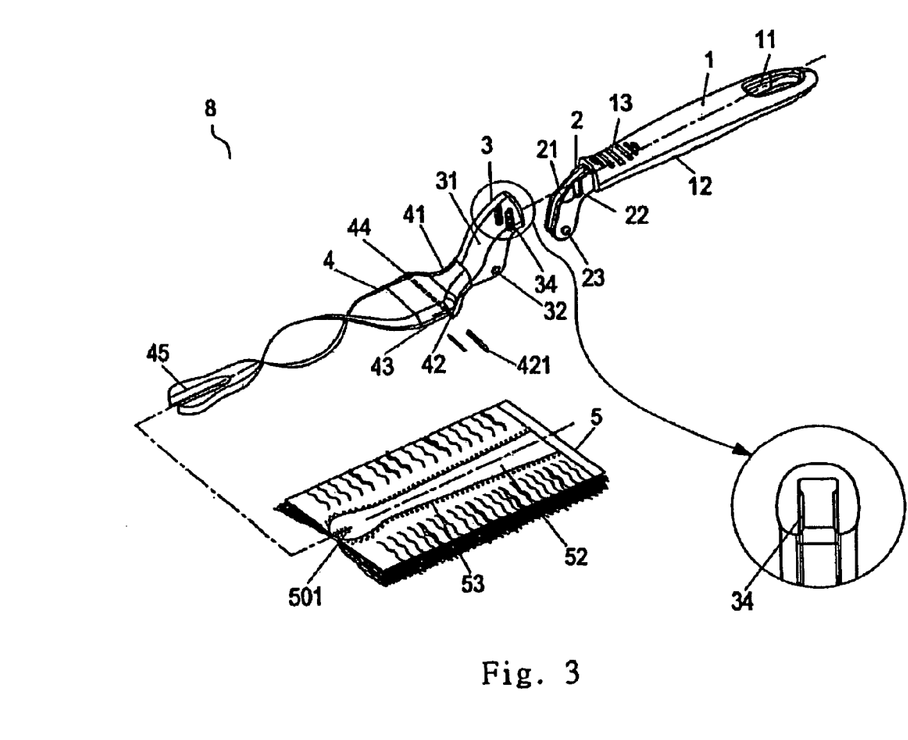
FIG. 3 is an exploded view of the spiral duster according to the present invention.
Figure 4:
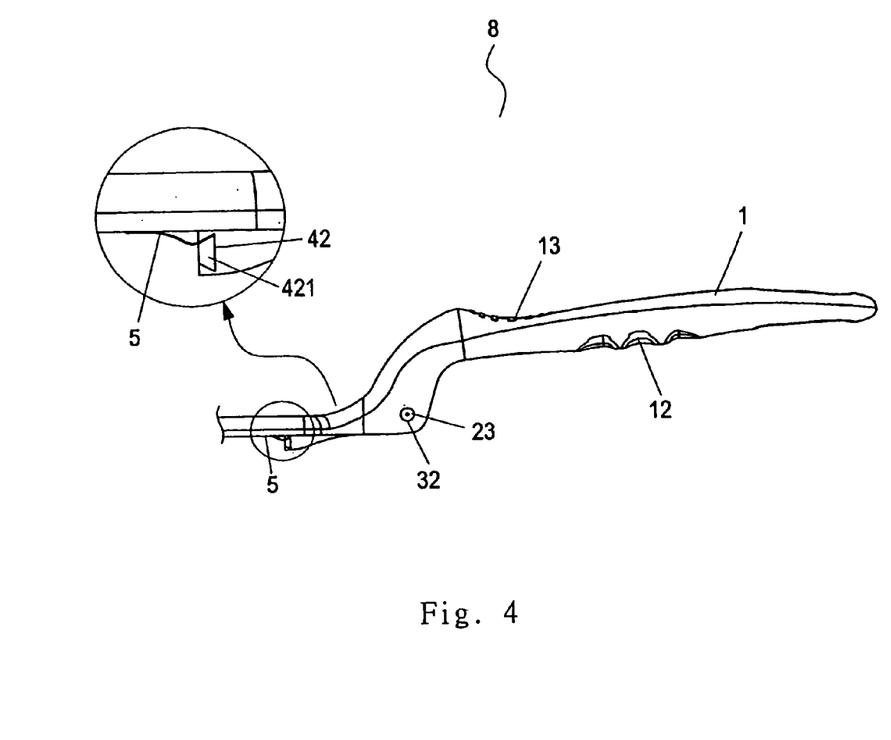
FIG. 4 is a schematic view of the handle and the spiral member according to the present invention.

Refer to FIGS. 3 and 4, which are an exploded view of the spiral duster and a schematic view of the handle and the spiral member according to the present invention. As shown in FIG. 3, the spiral duster 8 includes a handle 1, a bent member 2, a bent tenon 3, a spiral member 4, and the cleaning cloth 5.

The handle 1 has a through hole 11 at the rear end. A embossment 13 is formed at the front end of the handle 1. Further, a number of indentations 12 are formed on the lateral surfaces of the handle 1 for better manipulation. The bent member 2 is connected to the front end of the handle 1. The two lateral surfaces of the bent member 2 are formed with respective grooves 22. Two studs 23 are formed on the lower portions of the two lateral surfaces of the bent member 2 respectively, and a recessed channel 21 is disposed in the middle of the bent member 2.

The bent tenon 3 is connected to the bent member 2. The bent tenon 3 has a cambered recess 31 for receiving the bent member 2. Each of the two lateral surfaces of the cambered recess 31 includes a flange 34 to engage with the grooves 22. Two holes 32 are formed on the lower portions of the lateral surfaces of the cambered recess 31 respectively for receiving the studs 23.

The spiral member 4 has a neck 41 connected to the front end of the bent tenon 3 and a flat portion 43 extended from the neck 41. A slot 42 is disposed under the flat portion 43. The spiral member 4 is to be received in the pocket 52 of the cleaning cloth 5, such that the cleaning cloth 5 becomes spiral by wrapping around the spiral member 4. One end of the cleaning cloth 5 is inserted into the slot 42. A bar 421 is inserted into the slot 42 for fixing the cleaning cloth 5 to the spiral member 4. A number of hooks 44 are disposed on the two lateral surfaces of the spiral member 4 for clasping the cleaning cloth 5.

The front end 45 of the spiral member 4 is biforked so as to fit in the biforked section 501 of the pocket 52 of the cleaning cloth 5.

Alternatively, the pocket 52 of the cleaning cloth 5 may have a rounded section, and the front end 45 may also be rounded so as to fit in the rounded section of the pocket 52.

Figure 5:
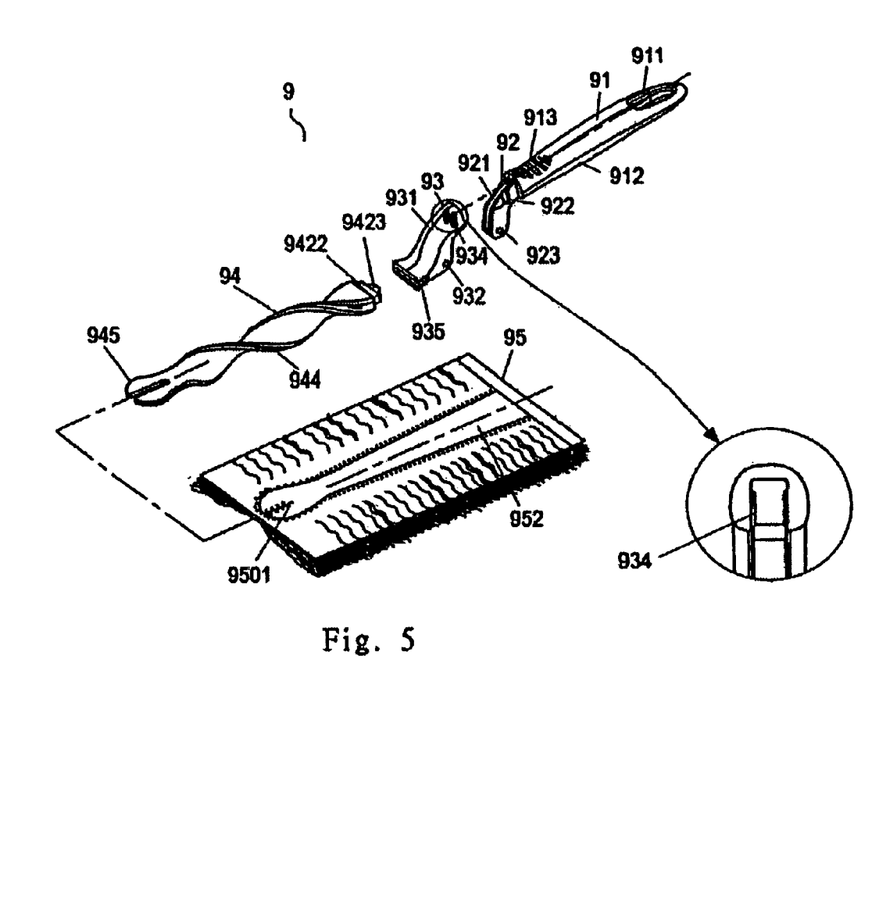
FIG. 5 is an exploded view of the spiral duster according to another embodiment of the present invention.
Figure 6:
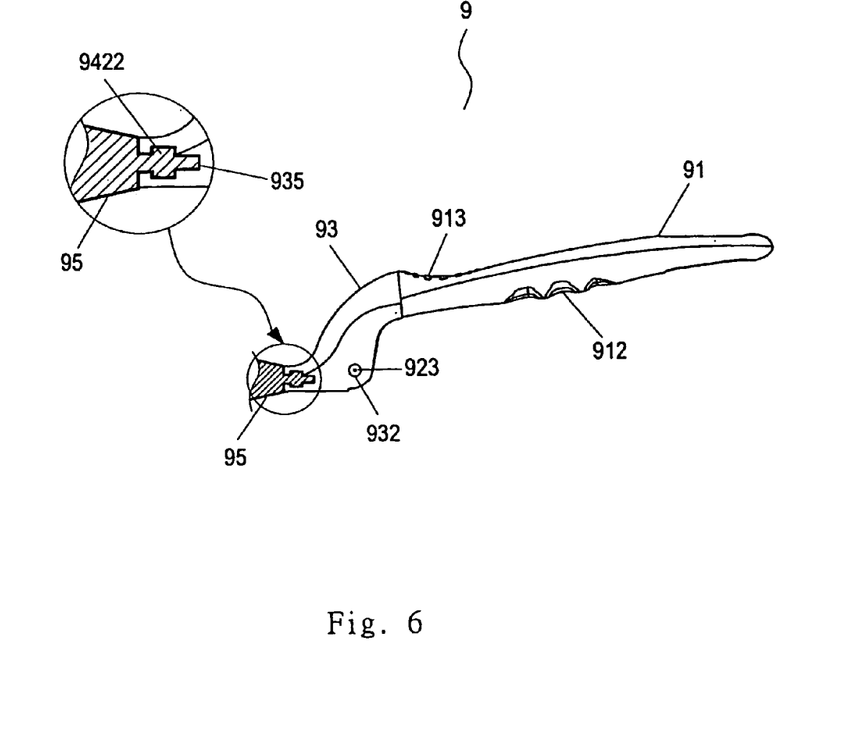
FIG. 6 is a schematic view of the handle and the spiral member according to another embodiment of the present invention.

Referring now to FIGS. 5 and 6, the spiral duster 9 according to another embodiment of the present invention is illustrated. As shown in FIG. 5, the spiral duster 9 includes a handle 91, a bent member 92, a bent tenon 93, a spiral member 94, and a cleaning cloth 95. However, the detailed description of the cleaning cloth 95 is omitted herein since the structure of the cleaning cloth 95 is identical to that of the cleaning cloth 5.

The handle 91 has a through hole 911 at the rear end. A embossment 913 is formed at the front end of the handle 91. Further, a number of indentations 912 are formed on the lateral surfaces of the handle 91 for better manipulation. The bent member 92 is connected to the front end of the handle 91. The two lateral surfaces of the bent member 92 are formed with respective grooves 922. Two studs 923 are formed on the lower portions of the two lateral surfaces of the bent member 92 respectively, and a recessed channel 921 is disposed in the middle of the bent member 92.

The bent tenon 93 is connected to the bent member 92. The bent tenon 93 has a cambered recess 931 for receiving the bent member 92. Each of the two lateral surfaces of the cambered recess 931 includes a flange 934 to engage with the grooves 922. Two holes 932 are formed on the lower portions of the lateral surfaces of the cambered recess 931 respectively for receiving the studs 923. A slot 935 is disposed on the front end of the bent tenon 93.

The spiral member 94 is to be received in the pocket 952 of the cleaning cloth 95, such that the cleaning cloth 95 becomes spiral by wrapping around the spiral member 94. A number of hooks 944 are disposed on the two lateral surfaces of the spiral member 94 for clasping the cleaning cloth 95. A protrusion 9422 is formed on the rear end of the spiral member 94 and an ear 9423 extends from the protrusion 9422. One end of the cleaning cloth 95 is inserted into the slot 935. The protrusion 9422 and the ear 9423 are inserted into the slot 935 for connecting the spiral member 94 to the front end of the bent tenon 93 and fixing the cleaning cloth 95 to the spiral member 94.

The front end 945 of the spiral member 94 is biforked so as to fit in a biforked section 9501 of the pocket 952 of the cleaning cloth 95.

Alternatively, the pocket 952 of the cleaning cloth 95 may have a rounded section, and the front end 945 may also be rounded so as to fit in the rounded section of the pocket 952.

Figure 7:
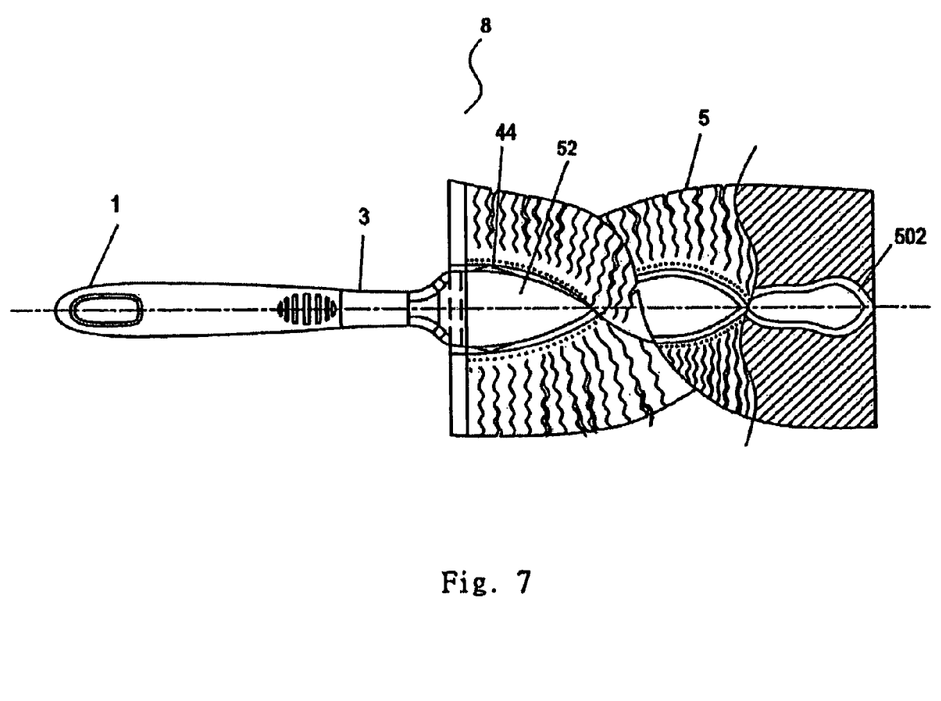
FIG. 7 is a schematic view of the spiral duster including a spiral member with a rounded front end according to the present invention.
Figure 8:
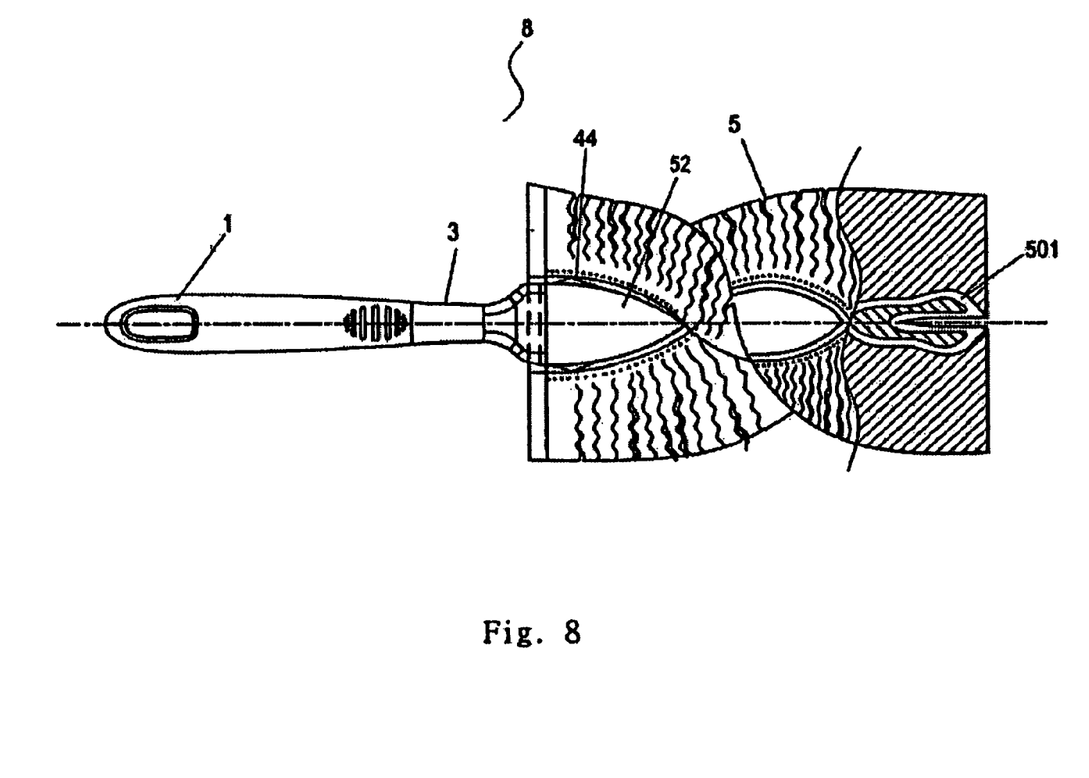
FIG. 8 is a schematic view of the spiral duster including a spiral member with a biforked front end according to the present invention.

Referring to FIGS. 7 and 8, which are schematic views of the spiral duster including a spiral member with a rounded front end and the spiral duster including a spiral member with a biforked front end according to the present invention. As shown in FIG. 7, the pocket 52 of the cleaning cloth 5 has a rounded section 502 for receiving the spiral member with a rounded front end. Meanwhile, as shown in FIG. 8, the pocket 52 of the cleaning cloth 5 has a biforked section 502 for receiving the spiral member with a biforked front end.

Figure 9:
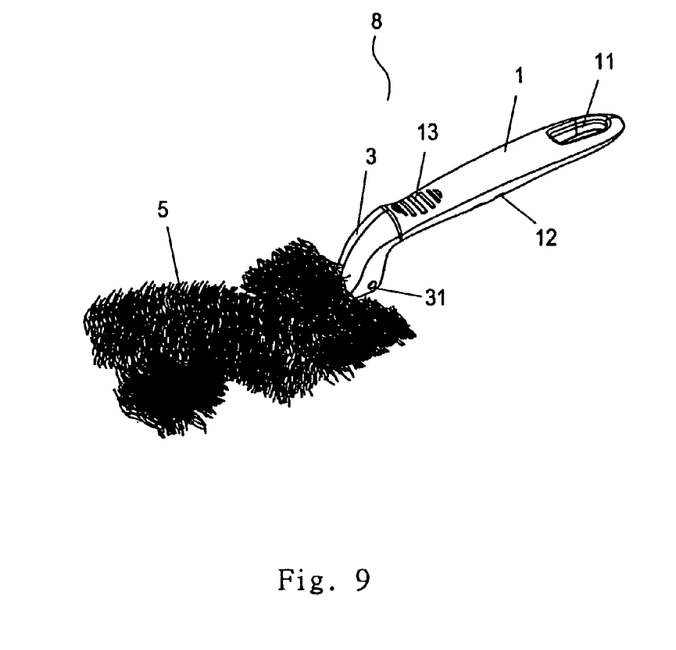
FIG. 9 is a schematic view of the spiral duster according to the present invention.
Figure 10:
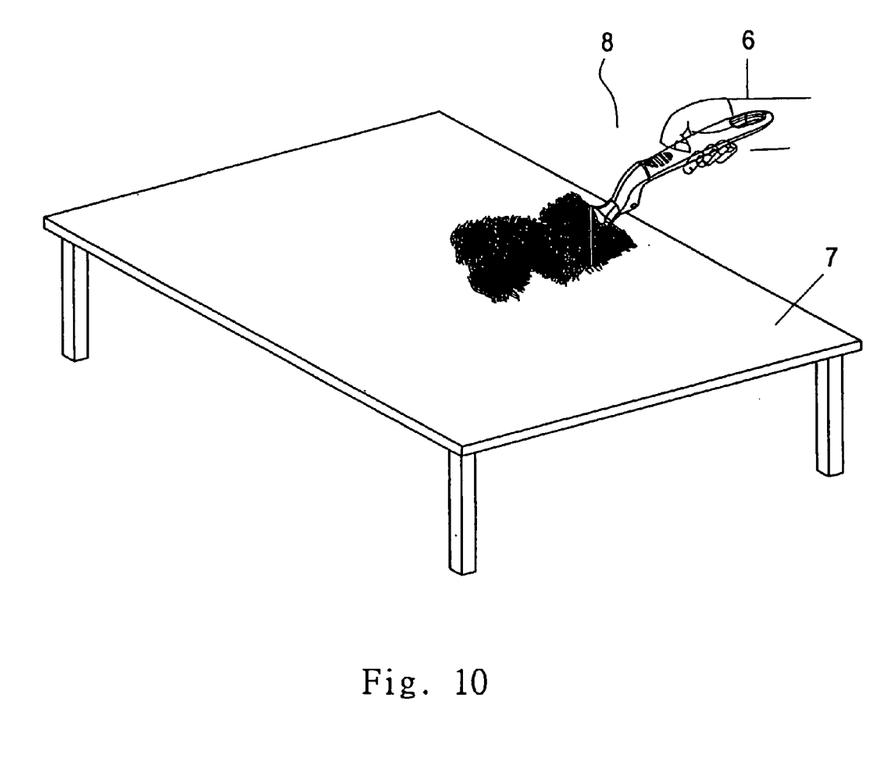
FIG. 10 is a schematic view showing the application of the spiral duster according to the present invention.

FIG. 9 shows an assembly of the spiral duster according to the present invention, where the spiral member is received in the cleaning cloth 5 so that the cleaning cloth 5 becomes spiral. FIG. 10 shows the application of the spiral duster 8 according to the present invention, wherein the spiral duster 8 is held by the user's hand 6 for cleaning the table 7.

Furthermore, in the present invention, the thermal pressing is carried out with an ultrasonic wave of power from 1000 kw to 5000 kw. The yarn layers of the cleaning cloth have a number of nodes spaced from each other with a distance of about 10 centimeters. The spiral member is integrated with the handle by inserting the studs on the bent member into the holes on the cambered recess of the bent tenon, so that an angle between the handle and the spiral member is from 0 degree to 360 degrees. The handle is integrated with the spiral member so that the spiral duster is a two-section device. Alternatively, the handle is integrated with the spiral member by the bent tenon so that the spiral duster is a trisection device. Although the first electrostatic non-woven fabric layers and the second electrostatic non-woven fabric layers are meshed, they may alternatively be non-meshed. The spiral member is twisted at an angle from 90 degrees to 270 degrees.

Figure 2:
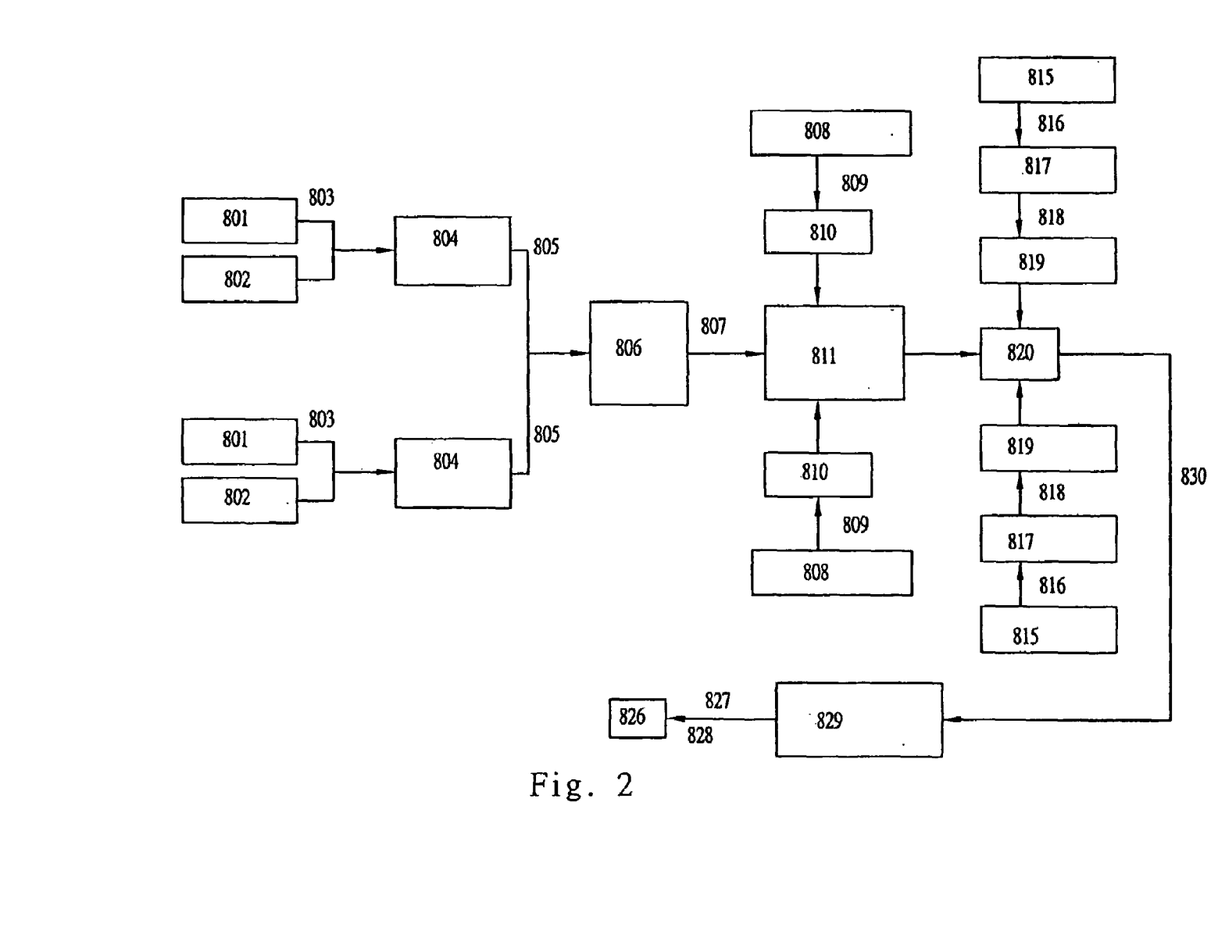
FIG. 2 is a flowchart of the method for fabricating the cleaning cloth of the spiral duster according to the present invention.

Referring to FIG. 2, the method for fabricating the cleaning cloth according to the present invention will be described herein. Initially, two first electrostatic non-woven fabric layers (801) and two smooth non-woven fabric layers (802) are processed by thermal pressing (803) to become meshed (804). Then the four layers are cut (805) to form a number of strips on the lateral sides (806). A plurality of yarn (808) is intermingled (809) to form two yarn layers (810). The two yarn layers (810) are disposed on the outer surfaces of the first electrostatic non-woven fabric layers (801) to form a six-layer structure (811). Two second electrostatic non-woven fabric layers (815) are also processed by thermal pressing (816) to be meshed (817) and then cut (818) to form a number of strips on the lateral sides (819). The eight layers (820) are then combined (830) with an opening left (829) by thermal-pressing (828) and cut (827) to become a finished product (826).

What is claimed is:

1. A spiral duster comprising:
   a cleaning cloth with an eight-layer structure including:
     two smooth non-woven fabric layers as liner layers;

two first electrostatic non-woven fabric layers disposed on outer surfaces of the smooth non-woven fabric layers respectively;

two yarn layers disposed on outer surfaces of the first electrostatic non-woven fabric layers respectively; and two second electrostatic non-woven fabric layers disposed on outer surfaces of the yarn layers respectively;

wherein lateral sides of the smooth non-woven fabric layers, the first electrostatic non-woven fabric layers, and the second electrostatic non-woven fabric layers comprise a number of strips;

and a pocket is formed in the middle of the cleaning cloth;

a handle;

a bent member connected to a front end of the handle, wherein two lateral surfaces of the bent member are formed with respective grooves; two studs are formed on lower portions of the lateral surfaces of the bent member respectively; and a recessed channel is disposed in the middle of the bent member;

a bent tenon connected to the bent member, wherein the bent tenon has a cambered recess for receiving the bent member; each of two lateral surfaces of the cambered recess comprises a flange to engage with the grooves; and two holes are formed on lower portions of the lateral surfaces of the cambered recess respectively for receiving the studs; and a spiral member having a neck connected to a front end of the bent tenon and a flat portion extended from the neck, wherein a slot is disposed under the flat portion; the spiral member is to be received in the pocket of the cleaning cloth such that the cleaning cloth becomes spiral by wrapping around the spiral member; one end of the cleaning cloth is inserted into the slot; a bar is inserted into the slot for fixing the cleaning cloth to the spiral member.

2. A spiral duster comprising:

a cleaning cloth with an eight-layer structure including:

two smooth non-woven fabric layers as liner layers;

two first electrostatic non-woven fabric layers disposed on outer surfaces of the smooth non-woven fabric layers respectively;

two yarn layers disposed on outer surfaces of the first electrostatic non-woven fabric layers respectively; and two second electrostatic non-woven fabric layers disposed on outer surfaces of the yarn layers respectively;

wherein lateral sides of the smooth non-woven fabric layers, the first electrostatic non-woven fabric layers, and the second electrostatic non-woven fabric layers comprise a number of strips;

and a pocket is formed in the middle of the cleaning cloth;

a handle;

a bent member connected to a front end of the handle, wherein two lateral surfaces of the bent member are formed with respective grooves; two studs are formed on lower portions of the lateral surfaces of the bent member respectively; and a recessed channel is disposed in the middle of the bent member;

a bent tenon connected to the bent member, wherein the bent tenon has a cambered recess for receiving the bent member; each of two lateral surfaces of the cambered recess comprises a flange to engage with the grooves; two holes are formed on lower portions of the lateral surfaces of the cambered recess respectively for receiving the studs; and a slot is disposed on a front end of the bent tenon; and a spiral member to be received in the pocket of the cleaning cloth such that the cleaning cloth becomes spiral by wrapping around the spiral member, wherein a number of hooks are disposed on two lateral surfaces of the spiral member for clasping the cleaning cloth; a protrusion is formed on a rear end of the spiral member and an ear extends from the protrusion; one end of the cleaning cloth is inserted into the slot; the protrusion and the ear are inserted into the slot for connecting the spiral member to the front end of the bent tenon and fixing the cleaning cloth to the spiral member.

3. The spiral duster of claim 1 or 2, wherein the pocket of the cleaning cloth comprises a biforked section, and a front end of the spiral member is biforked so as to fit in the biforked section of the pocket of the cleaning cloth.

4. The spiral duster of claim 1 or 2, wherein the pocket of the cleaning cloth comprises a rounded section, and a front end of the spiral member is rounded so as to fit in the rounded section of the pocket of the cleaning cloth.

5. The spiral duster of claim 1, wherein two lateral surfaces of the spiral member has a number of hooks for clasping the cleaning cloth.

6. The spiral duster of claim 1 or 2, wherein a number of spots are formed on a periphery of the pocket by thermal-pressing for firmly securing the eight-layer structure of the cleaning cloth.

7. The spiral duster of claim 1 or 2, wherein the thermal pressing is carried out with an ultrasonic wave of power 1000 kw to 5000 kw.

8. The spiral duster of claim 1 or 2, wherein the thermoplastic yarn layers comprise a number of nodes spaced from each other with a distance of about 10 centimeters.

9. The spiral duster of claim 1 or 2, wherein the spiral member is integrated with the handle by inserting the studs on the bent member into the holes on the cambered recess of the bent tenon, so that an angle between the handle and the spiral member is from 0 degree to 360 degrees.

10. The spiral duster of claim 1 or 2, wherein the handle is integrated with the spiral member so that the spiral duster is a two-section device.

11. The spiral duster of claim 1 or 2, wherein the handle is integrated with the spiral member by the bent tenon so that the spiral duster is a trisection devices.

12. The spiral duster of claim 1 or 2, wherein the spiral member is twisted at an angle from 90 degrees to 270 degrees.

13. The spiral duster of claim 1 or 2, wherein the first electrostatic non-woven fabric layers and the second electrostatic non-woven fabric layers are meshed.

* * * * *